United States Patent [19]

Sage

[11] 4,159,886
[45] Jul. 3, 1979

[54] PRESSURIZED CONVEYOR

[75] Inventor: Warnie L. Sage, Littleton, Colo.

[73] Assignee: The Babcock & Wilcox Company, New York, N.Y.

[21] Appl. No.: 874,718

[22] Filed: Feb. 2, 1978

[51] Int. Cl.² .............................................. B65G 65/42
[52] U.S. Cl. .................................... 414/292; 198/607; 198/626
[58] Field of Search ................. 214/17 A, 17 B, 17 C; 198/604, 607, 626, 627

[56] References Cited

U.S. PATENT DOCUMENTS

| 2,907,480 | 10/1959 | Vincent | 214/17 B |
| 3,762,534 | 10/1973 | Beresinsky | 198/627 |
| 3,880,274 | 4/1975 | Bechtloff et al. | 198/626 |

Primary Examiner—Albert J. Makay
Attorney, Agent, or Firm—Joseph M. Maguire; Edward A. Steen

[57] ABSTRACT

A coal conveyor capable of transporting pulverized coal to a higher pressure zone. The conveyor comprising an upright pressure vessel and a feed pipe extending into and between two endless conveyor belts located within the vessel which mesh during their descent to form a first and second pressure seal before the discharge of the coal into the higher pressure zone.

8 Claims, 8 Drawing Figures

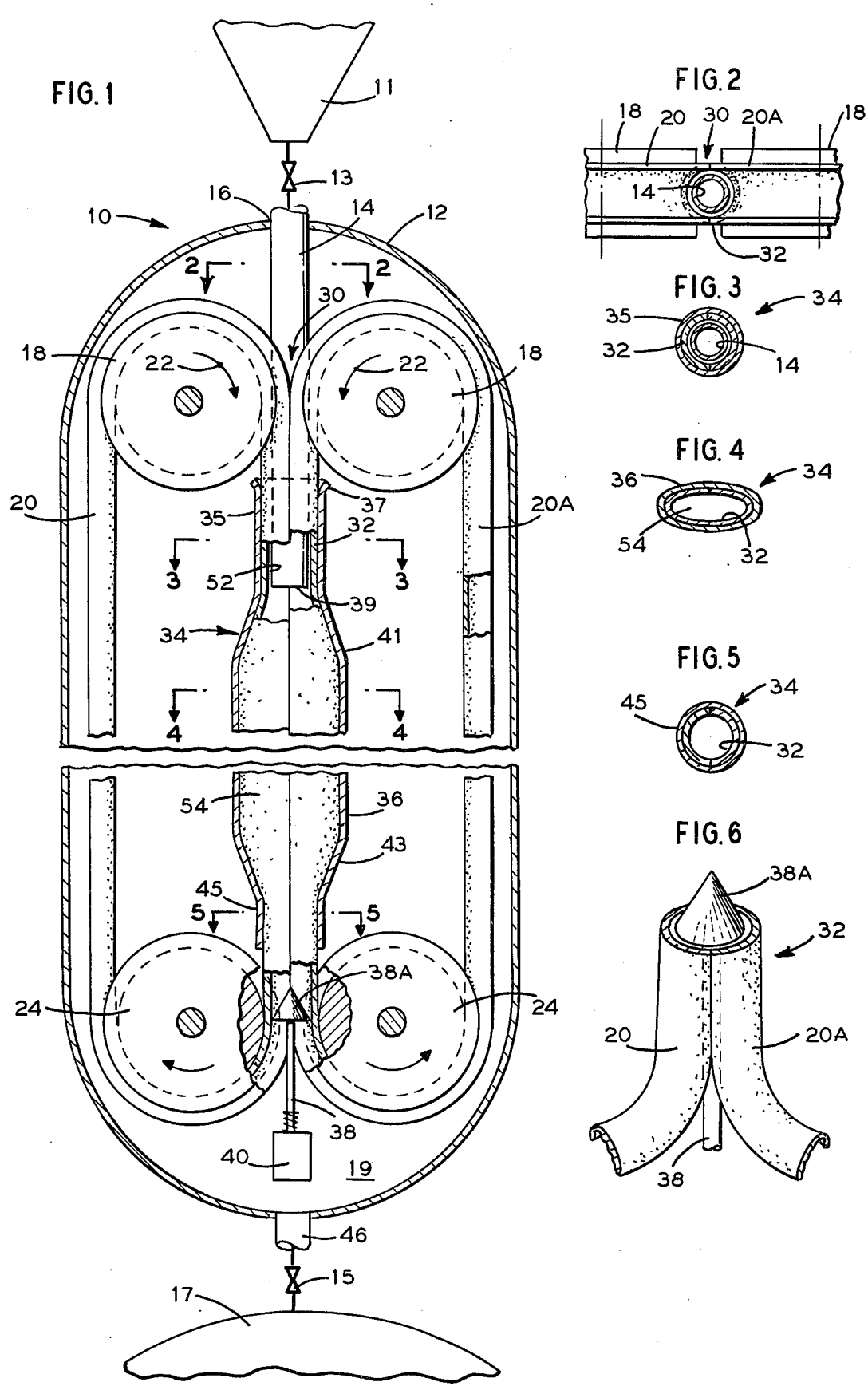

PRESSURIZED CONVEYOR

BACKGROUND OF THE INVENTION

1. Field of the Invention

The present invention relates to the conveyance of pulverized materials and more specifically to a pressurized conveyor capable of transporting pulverized coal to a higher pressure zone.

2. Description of the Prior Art

The practice of feeding pulverized coal into a coal gasifier presents a difficult problem. Owing to the fact that a gasifier operates at an elevated pressure level whereas the coal is generally stored at atmospheric pressure, a reliable economic conveyor is necessary to transcend the large pressure differential involved so that the coal may be fed into the gasifier.

The prior practice has been to use various expensive and complicated conveying systems, e.g., lock hoppers and pumped slurry systems. At highly elevated pressures, i.e., 1500 psi, it is believed that the valves currently employed in lock hopper systems may not be reliable. In addition, the gas compression cost becomes prohibitive as the pressure differential increases. Slurry pump systems have also proved to be expensive. Not only does the pulverized coal have to be slurried, but, prior to its introduction into the gasifier, it must be deslurried through an involved series of steps involving various heaters, settling tanks and pumps. Furthermore, if a water slurry is employed, any water injected into the gasifier will depress the flame temperature thereby necessitating elaborate dewatering systems. An oil slurry is unattractive because of the cost of oil.

SUMMARY OF THE INVENTION

The present invention is directed at an apparatus which can economically convey pulverized coal from a low pressure zone to a higher pressure zone. It should, however, be recognized that the disclosed conveyor may also be used to convey pulverized materials other than coal.

During studies to determine the characteristics of transported dense phase crushed and powdered coals passing through relatively narrow pipes and tubes, it was determined that if a short section of tube is plugged with compacted pulverized material, the material will form an effective pressure seal within the tube, capable of withstanding a substantial pressure differential developed across the tube ends. In addition, it was found that the wall friction engendered by the compacted plug is sufficient to withstand the considerable force resulting from the large pressure differential before any plug movement is discernible.

Accordingly, there is provided a pulverized coal conveyor having an upright pressure vessel. Two mutually facing semi-circular belts are rotated within the vessel so that they mesh on the downward side to form a belt tube. At the head of the vessel, a pulverized feed pipe extends downward directly into the belt tube forming a first pressure seal between the belt tube and the pulverized feed pipe. An intermediate portion of the belt tube is enclosed in a guide tube which forces the belt tube to assume an elliptical configuration thereby compacting the solids within the belt tube to form a second pressure seal during its downward path. At the lower end of the vessel, the belt tube separates into its two component belts to discharge the coal into the lower portion of the pressure vessel for feeding into a pressurized holding tank.

BRIEF DESCRIPTION OF THE DRAWINGS

FIG. 1 is a cross sectional elevation of the pressurized conveyor embodying the invention;

FIG. 2 is a view taken along line 2—2 of FIG. 1;

FIG. 3 is a view taken along line 3—3 of FIG. 1;

FIG. 4 is a view taken along line 4—4 of FIG. 1;

FIG. 5 is a view taken along line 5—5 of FIG. 1;

FIG. 6 is a detailed view embodying a feature of the invention;

DESCRIPTION OF THE PREFERRED EMBODIMENT OF THE INVENTION

Figure 7:
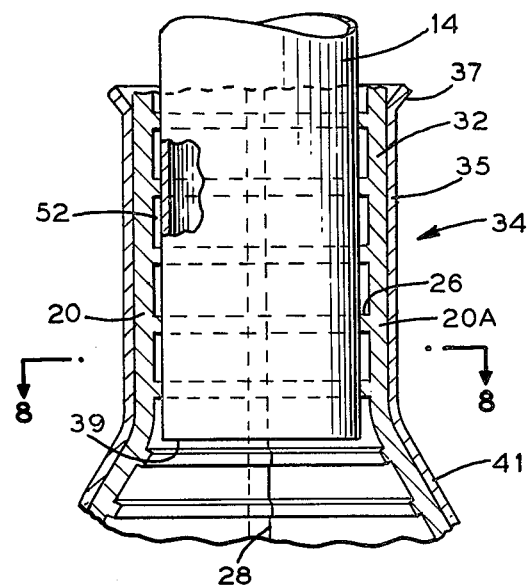
FIG. 7 is a detailed part sectional view taken along line 7—7 of FIG. 8.

Referring to FIG. 1, there is shown a gravity fed pressurized conveyor 10 comprising an upright pressure vessel 12. A pulverized material feed pipe 14 of circular horizontal cross section enters the vessel 12 through inlet 16 and travels partially downward within the vessel 12 passing between a pair of upper belt idlers 18 suitably supported within the vessel 12. Two endless upright flexible conveyor belts 20 and 20A are driven in the direction of arrows 22 by the upper belt idlers 18 and like-supported lower belt drives 24. The lower belt drives 24 are both powered by a variable speed driving mechanism (not shown). Both conveyor belts 20 and 20A are preferably semi-circular in shape and are equipped with a plurality of internal circumferentially oriented labyrinth seal rings 26 and longitudinally oriented lapping seals 28. See FIGS. 7 and 8. As the two belts 20 and 20A travel over idlers 18 and commence their downward descent, they mesh at location 30 to form circular belt tube 32 while enveloping the pulverized feed pipe 14. As belt tube 32 envelopes the feed pipe 14, a first pressure seal 52 is formed between belt tube 32 and feed pipe 14. Not only do the labyrinth sealing rings 26 insure a secure pressure seal but they also aid in the transport of the entrained coal by virtue of their constant downward wiping action.

Guide tube 34 is comprised of upper and lower members 35 and 45 of circular horizontal cross section, an intermediate member 36 of elliptical horizontal cross section, and upper and lower transition members 41 and 43 interconnecting the upper and lower members 35 and 45, respectively, to the intermediate member 36. Each of the transition members is formed with a circular end conforming to the respective configurations of either the upper or lower members 35 and 45 and an opposed elliptical end conforming to the configuration of the intermediate member 36. The horizontal cross section transition member changes gradually in shape to conform to its respective ends.

The upper member 35, comprising an outwardly diverging end section 37, circumscribes both the pulverized feed pipe 14 and the belt tube 32. Below the discharge end 39 of the pulverized feed pipe 14, the upper transition member 41 and the intermediate member 36 of guide tube 34 cause the belt tube 32 to gradually assume an elliptical horizontal cross section, as indicated by FIG. 4, preferably having a major-minor axis ratio of approximately 2 to 1. This physical orientation reduces the cross sectional area of the belt tube 32 by about 20% while simultaneously retaining the original circumferential length. By forcing the belt tube 32 from a circular to an elliptical configuration, the entrained coal is compacted to form a continuous coal plug which, as it travels downward through the intermediate section 36, creates a second pressure seal 54 between the superatmospheric pressure within the vessel 10 and the atmospheric pressure within the coal reservoir 11. The pressure differential between the two zones of operation is insufficient to overcome the wall friction engendered by the compacted plug. As a consequence, coal can be continously fed into the pressurized coal holding tank 17 without the risk of a pressure loss or of a coal flow interruption due to blowback.

Towards the bottom of pressure vessel 12, the lower transition member 43 gradually allows the belt tube 32 to resume its circular horizontal cross-section before it enters the lower member 45, located just above lower belt drives 24. Shortly thereafter, the belt tube 32 is separated into its two component conveyor belts 20 and 20A by lower belt drives 24 to discharge the entrained coal toward the outlet 46 via receiving space 19.

A spring loaded cone valve 38, connected to sensing means 40, is disposed at the discharge end of belt tube 32 to maintain upward mechanical pressure against the coal flow. By maintaining pressure against the flow, the cone valve 38 permits the initial filling of the belt tube 32. During normal operation, the coal flow is sufficient to overcome the pressure exerted by the valve 38 by depressing cone 38A downward. If, however, the belt tube 32 begins to run empty, the cone 38A will move upwards generating a signal within the sensing means 40 to close valve 15, permitting the reestablishment of the pressure seal 54. In addition, the sensing means 40 can be used to trip other safety equipment (not shown) to correct the problem encountered and if need be, shut down the pressurized conveyor 10.

FIG. 2 shows a more detailed view of location 30, the point where the two belts 20 and 20A mesh together around feed pipe 14 to form the belt tube 32.

FIGS. 3, 4 and 5 each represent a different successive orientation assumed by the belt tube 32 as it is driven downward through the vessel 12. In particular, FIG. 4 shows a cross sectional view of the elliptical portion of the belt tube 32, the second coal seal 54 and the intermediate section 36 of the guide tube 34 circumscribing the belt tube 32.

FIG. 6 is a detailed representation of the cone valve 38 situated within the belt tube 32.

FIG. 7 shows a more detailed view of the feed pipe discharge end 39. Each conveyor belt 20 and 20A comprises a plurality of internally circumscribing labyrinth seals 26 to form the first pressure seal 52 with the pulverized feed pipe 14. The upper section 35 of guide tube 34 is oriented to directly envelope belt tube 32 and indirectly envelope pulverized feed pipe 14.

Figure 8:
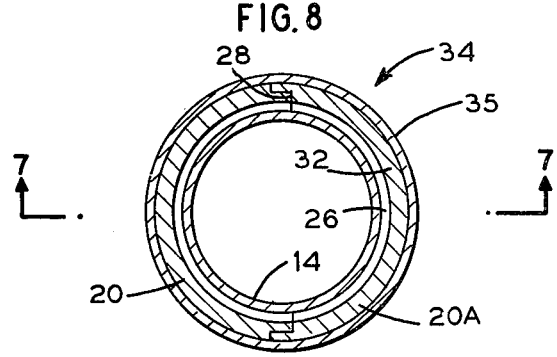
FIG. 8 is a detailed view taken along line 8—8 of FIG. 7.

FIG. 8, a detailed enlargement of FIG. 3, shows both conveyor belts 20 and 20A joined together by lapping seals 28, and circumscribed by the upper section 35 of the guide tube 34 to form the circular belt tube 32.

Under normal operating conditions, the pressurized conveyor 10 operates at the same pressure as the pressurized coal holding tank 17. Pulverized coal is first introduced into the conveyor 10 before pressurization is attempted in order to generate the second coal pressure seal 54 capable of withstanding the resulting pressure differential accruing across the belt tube 32. Pressure equilization is then accomplished by opening valve 15.

The reservoir 11 is connected to pulverized feed pipe 14. The coal passes through valve 13 which may be closed by sensing means 40 in the event of a coal service interruption to maintain the pressure integrity of pressure vessel 12. The entrained coal then flows into the pressure vessel 12 through pulverized feed pipe 14. The belt tube 32 engages pipe 14 to form the first pressure seal 52 and thereafter receives the coal which is subsequently compacted by guide tube 34 to form the second coal pressure seal 54 as the belt tube 32 continues in its downward motion. As belt tube 32 separates about lower belt drives 24, the coal collects in the receiving space 19 at the lower end of the pressure vessel 12 before being discharged through the outlet 46. The valve 15 is disposed in outlet 46 and may be closed when the pressurized conveyor is out of service.

While in accordance with provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

The embodiments of the invention in which an exclusive property or privilege is claimed are defined as follows:

1. An apparatus for conveying pulverized material to a higher pressure zone, and comprising an upright pressure vessel having an inlet and an outlet, a pair of endless flexible belts disposed within the vessel, upper and lower rotatable means for urging continuous travel of the belts, the upper rotatable means causing opposed sections of the belts to unite and form a downward traveling belt tube, a pulverized material feed pipe extending through the vessel inlet and into the belt tube and cooperating therewith to form a first pressure seal therebetween, a guide tube disposed between the upper and lower rotatable means and circumscribing both the belt tube and feed pipe, the guide tube acting on the belt tube to compact the pulverized material therein to form a second pressure seal, and the lower rotatable means causing the belts to separate and discharge the pulverized material from said belt tube.

2. The apparatus according to claim 1 wherein the guide tube comprises upper and lower members having circular horizontal cross sections and an intermediate member of elliptical horizontal cross section interposed therebetween.

3. The apparatus according to claim 2 wherein the guide tube comprises transition members of circular and elliptical horizontal end cross-sections, the transition members interconnecting the upper and lower members with the intermediate member.

4. The apparatus according to claim 2 wherein the elliptical cross section has a major-minor axis ratio of approximately 2 to 1.

5. The apparatus according to claim 1 wherein the interior surfaces of the belts are lined with a plurality of spaced labyrinth sealing rings.

6. The apparatus according to claim 1 wherein the belts include longitudinally disposed lapping seals.

7. The apparatus according to claim 1 including sensing means for detecting an interruption in coal flow.

8. The apparatus according to claim 1 including a valve means disposed at the belt tube discharge.

* * * * *